Oct. 21, 1952  E. A. DINGLEY  2,614,712
TRACTOR MOUNTED SHOVEL LOADER
Filed April 19, 1946
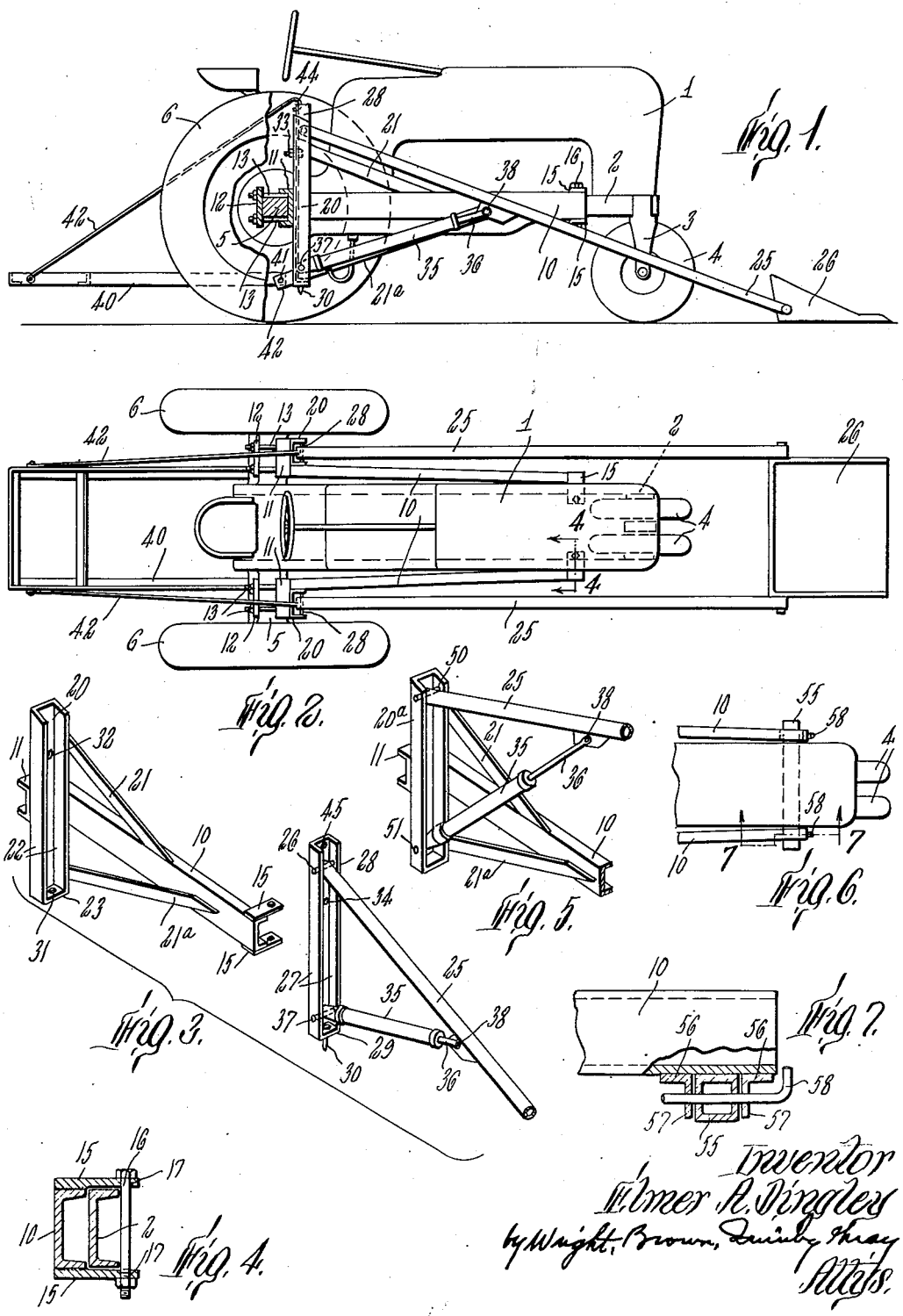

Patented Oct. 21, 1952

2,614,712

UNITED STATES PATENT OFFICE 2,614,712

TRACTOR MOUNTED SHOVEL LOADER

Elmer A. Dingley, Natick, Mass.

Application April 19, 1946, Serial No. 663,331

1 Claim. (Cl. 214—131)

This invention relates to loaders and has for an object to produce a loader which may be quickly applied to or detached from a tractor.

A further object is to so relate the loading mechanism to the tractor that the weight of the load is supported mostly by the rear wheels of the tractor which are usually supported on firmer ground and are otherwise better adapted to take load than are the front wheels.

Still another object is to provide a loader which in low position is kept low so that it may be moved forwardly beneath any structure where the tractor itself may be run.

A further object is to provide a reinforcing frame portion for the tractor and to which the loader may be secured thus to distribute the stresses imparted by the loader on the tractor, and which is also of great utility when a counterbalance platform is employed.

For a more complete understanding of this invention, reference may be had to the accompanying drawings in which:

Figure 1 is a somewhat diagrammatic side elevation of a tractor showing the loader applied thereto.

Figure 2 is a top plan view of the same.

Figure 3 is an exploded perspective view of the loader mounting frame and the rear portion of the loader.

Figure 4 is a detail sectional view on line 4—4 of Figure 2.

Figure 5 is a perspective view showing a modified form of loader mounting frame and showing the rear portion of the loader mounted thereon.

Figure 6 is a view similar to a portion of Figure 2, but showing a further modification.

Figure 7 is a detail sectional view on line 7—7 of Figure 6.

Referring first to the construction shown in Figures 1, 2, and 3, at 1 is indicated the body portion of a tractor of a well known make. A portion of this body comprises a pair of longitudinally extending spaced side frame elements 2. The forward end of the frame elements 2 support a forward steering axle-carrying element 3 provided with a pair of closely spaced wheels 4. The ends of the frame elements 2 are secured to a rear axle member 5, and more widely spaced rear wheels 6 are supported at opposite ends of the axle member 5. This represents a tractor of a well known type.

For the purpose of this invention, a pair of loader supports or torque arms are applied to the side portions of the tractor. Each of these loader supports, as shown best in Figure 3, comprises a longitudinally extending channel member 10 having at its rear end a rearwardly facing channel member 11 engageable about the forward portion of the axle member 5 and secured thereto as by the clamp plate 12 and the bolts 13.

The forward ends of the channel members 10 are arranged to be secured to the frame elements 2, and as shown this is done by the use of a pair of inwardly projecting plates 15 which may be welded to the flanges of the channel 10 and extend above and below the element 2. As shown in Figure 4, this element 2 is also commonly a channel member. The plates 15 extend somewhat inwardly of the channel element 2, and a bolt 16 passed through perforations 17 through the inner ends of the plates 15 secure these parts together, the bolts 16 passing inwardly of the elements 2. This channel member 10 provides means for reinforcing the body frame of the tractor and distributes the stresses thereto occasioned by the weight of the loader and its load. To the rear end portion of each of the channel members 10 is secured, in upright position, a housing 20 which extends above and below the axle-securing member 11. This member 20 may be braced in position from the corresponding channel member 10 as by the use of inclined straps 21 and 21a, secured at their rear ends to the member 20 above and below the axle, and at their forward ends to the channel member 10. Preferably the socket member 20 is formed with spaced side walls 22 and a perforated bottom wall 23 for the purpose of ready attachment and detachment of the rear ends of the loader with respect thereto as will appear.

As shown best in Figures 1, 2, and 3, the loader comprises a pair of side arms 25 which may be tubular, the forward ends of which have secured between them the loading scoop 26 of any suitable description. The rear end of each of the side arms 25 may be pivoted as on a cross pin 26 between the flanges 27 of an upright channel member 28 formed to nest between the side flanges 22 of the socket member 20, and preferably the bottom wall 29 of this member 28 is provided with a pin 30 which may be entered into the perforation 31 in the bottom wall 23 of the socket member. The upper portion of each member 28 may be secured within its socket member 20 as by a bolt passing through a hole 34 of the member 28 and a mating hole 32 in the base of the socket member 20. Thus by the placing or removal of these bolts 33 the loader may be secured or released from the tractor. Means for raising and lowering the forward ends of the arms 25 and the scoop may comprise hydraulic cylinders and pistons 35 and 36, one of which is pivoted at 37 to the lower portion of each member 28 and the other of which is pivoted to an ear 38 on the corresponding loader arm 25. With this arrangement it is a very simple matter to apply the loader to the tractor, this being done by blocking up the rear ends of the arms 25 in spaced relation so that the tractor can be run in between them and the members 28 guided into the sockets 20. By then removing the blocks, the members 28 may be dropped down so that the pins 30 pass through the bottom openings 31 in the sockets, whereupon the upper bolts 33 are placed in position.

In some cases it may be desired to counterbalance the weight of the scoop and its contents, and this arrangement of the loader supports lends itself well to supporting a counterbalance platform. For example, as shown in Figures 1 and 2, the counterbalance platform 40 is pivoted at 41 to an ear 42 extending from the lower portion of each socket member 20 and its rear end is connected by stay rods 42 to the upper ends of the members 28. The upper ends of the stay rods 42 are hooked, as at 44, and extend through perforations 45 in the upper ends of the members 28 which project somewhat above the upper ends of the socket members 20. When weights are applied to the platform 40 they act to effectively counterbalance the weight of the scoop 26 and its contents.

While the use of an upright member 28 as a part of the loader to engage within the socket member is preferred, if desired this member may be omitted and the rear ends of the loader arms 25 be pivoted directly as on the pins 50 (see Figure 5) at the upper ends of the socket members 20a, and the rear ends of the hoisting mechanisms, such as the hydraulic cylinders 35, may be pivoted on the cross pins 51 at the lower ends of the socket members 20.

In Figures 6 and 7 is shown a construction where the tractor body does not employ the side frame elements 2. In this case the forward ends of the loader supports, such as the channels 10, may be removably connected to a cross frame member 55 which is secured to the under part of the tractor body toward its forward end. As shown in Figure 7, each loader support 10 may be provided with a pair of spaced angle elements 56, one flange of each of which may be welded thereto and the depending flanges 57 of which may be provided with holes registering with holes through the cross member 55 for the reception of a removable pin 58. The loader supports thus distribute the stresses from the loader lengthwise between the rear axle and the forward portion of the tractor body so that these stresses are well distributed and taken care of over the tractor structure.

It will be noted that the entire loading mechanism is kept low, the side arms 25 being the highest portions of the loader when the loader is in lowered position, and that even when elevated, the only part which projects above these arms at any time is the scoop 26 and the adjacent portions of the arms 25. Thus the entire loader is kept low and can be pushed under any structure where the tractor itself is capable of being driven. The weight of the scoop and its load are also carried largely by the rear axle and wheels of the tractor.

From the foregoing description of certain embodiments of this invention it will be evident to those skilled in the art that various changes and modifications might be made without departing from its spirit or scope.

I claim:

In combination with a tractor having a body portion and a rear axle member supporting the rear end of said body portion, of a pair of loader supports each having a longitudinal member provided at its rear end with means engageable with said rear axle member, means securing the forward ends of said loader support to said body portion, each loader support having a loader securing member at its rear end, a loader, means securing the rear end of said loader to each of said loader securing members at a pair of positions at different elevations, said loader securing members each comprising a forwardly facing socket having side and bottom walls, said bottom wall having a hole therein, a loader having a pair of members at its rear end each fitting within one of said sockets and having a projection engageable in said bottom wall, and means for securing the upper portion of each of said loader members within its respective socket.

ELMER A. DINGLEY.

REFERENCES CITED

The following references are of record in the file of this patent:

UNITED STATES PATENTS

| Number | Name | Date |
|---|---|---|
| 1,852,200 | Camp | Apr. 5, 1932 |
| 1,886,655 | Doody | Nov. 8, 1932 |
| 2,001,803 | Stephens | May 21, 1935 |
| 2,268,689 | Andrus | Jan. 6, 1942 |
| 2,287,152 | Waldecker | June 23, 1942 |
| 2,319,921 | Dooley | May 25, 1943 |
| 2,341,776 | Heath | Feb. 15, 1944 |
| 2,395,622 | Galbreath | Feb. 26, 1946 |
| 2,402,064 | Markel | June 11, 1946 |
| 2,412,570 | Ender | Dec. 17, 1946 |
| 2,417,021 | Simmonds | Mar. 4, 1947 |
| 2,419,493 | Hoff | Apr. 22, 1947 |
| 2,427,461 | Johnson | Sept. 16, 1947 |
| 2,429,717 | Gordon | Oct. 28, 1947 |
| 2,437,808 | Drettman | Mar. 16, 1948 |
| 2,468,602 | Lord | Apr. 26, 1949 |
| 2,475,498 | Haynes | July 5, 1949 |
| 2,535,727 | Dingley | Dec. 26, 1950 |